Feb. 25, 1958  G. F. WALES  2,824,425
FLUID CUSHIONED CLUTCH MECHANISM
Filed Sept. 24, 1952  4 Sheets-Sheet 1

INVENTOR.
George F. Wales
BY
Attorney.

Feb. 25, 1958   G. F. WALES   2,824,425
FLUID CUSHIONED CLUTCH MECHANISM
Filed Sept. 24, 1952   4 Sheets-Sheet 2

INVENTOR.
George F. Wales
BY
Attorney.

Feb. 25, 1958 G. F. WALES 2,824,425

FLUID CUSHIONED CLUTCH MECHANISM

Filed Sept. 24, 1952 4 Sheets-Sheet 3

INVENTOR.
George F. Wales
BY
Attorney.

INVENTOR.
George F. Wales
BY
Attorney

United States Patent Office 2,824,425
Patented Feb. 25, 1958

2,824,425

FLUID CUSHIONED CLUTCH MECHANISM

George F. Wales, Kenmore, N. Y.

Application September 24, 1952, Serial No. 311,182

9 Claims. (Cl. 60—54.5)

The present invention relates to power transmitting devices and more particularly to a clutch device by which movement and force are transmitted from one member to another by selective entrapment of liquid therebetween.

In still another aspect the invention relates to a clutch for use on a punch press or like machine tool for connecting the driving, reciprocating ram to the driven tool holder adjacent the working area of the machine. More especially still, this invention relates to an improvement on the clutch device of my prior application Serial No. 73,271, filed January 28, 1949, now Patent No. 2,621,480, granted December 16, 1952.

There are many advantages in a punch press or the like in positioning the clutch, which couples the driving part and the driven part, adjacent the working area instead of adjacent the flywheel. These advantages are discussed in detail in my pending prior application Serial No. 730,903, now Patent No. 2,627,758, granted February 10, 1953, and in my prior Patent No. 2,528,198 which disclose face type or eccentric clutches.

Where the driving part is connected to the driven part through a dog-type clutch adjacent the flywheel, a long clutch-actuating linkage has to be provided between the foot-treadle and the flywheel. Moreover, the actuating cams are relatively inaccessible, having to be disposed in the back of the machine in the region of the flywheel. In addition, particularly on a gap-type press, such as is shown in my Patent No. 2,364,011, the inertia forces, which must be overcome when the dog-type clutch engages, are very great, because the piston, pitman and related parts must be accelerated from a standing start to the velocity of the flywheel. Furthermore, these parts must be accelerated against the friction brake, which is part of the conventional dog clutch installation. For all these reasons high loads are imposed on a clutch disposed adjacent the flywheel.

In my prior application Serial No. 73,271, now Patent No. 2,621,480, and in Patent No. 2,528,198 assigned to my interests, there is disclosed a clutch which is disposed adjacent the work area. In both these cases, the flywheel, piston, pitman, and a good deal of the clutch mass are in continuous movement and therefore need not be accelerated from zero velocity. The driven part, which requires to be accelerated, when the clutch is engaged, is of relatively small mass. Furthermore, this part does not have to be accelerated against a friction brake because no friction brake is needed or employed.

In addition in my prior application Serial No. 73,271, now Patent No. 2,621,480, referred to above, engagement of the mating parts of the clutch is through a column of liquid, and this engagement takes place at a point in the sinusoidal curve of the piston velocity where the relative velocities of the moving and stationary parts of the clutch are at or nearly zero. Thus, the shock loads associated with clutch engagement are reduced to a minimum, permitting the use of smaller components for a given force to be transmitted.

Among the added advantages of employing an entrapped liquid to transmit power from a reciprocating member to a reciprocable member, as, for instance, between the pitman and the ram in a metal working press, is the elimination of any mating or intermeshing mechanical parts, for such parts are subject to wear, and are sources of noise. A further advantage is the creation of a small and precise resilient give or yield, which eliminates the shock loads normally associated with metal working presses and in particular those associated with blanking and perforating operations.

As has been mentioned in my prior application Serial No. 73,271, now Patent No. 2,621,480, above identified, while it is well known that hydraulic power provides a soft cushioning force essential to the long life of a machine tool, one limiting factor in the use of hydraulic means for this type of operation, prior to the invention of my above-mentioned copending application, was the slowness of the travel of the liquid transmitting force through the piping and other ducts. This meant that high speed operations could not be realized. In addition, the large volumes of liquids involved in hydraulic presses introduce shock loads, since the liquid volumes are such that the compressibility of the liquid causes a shock loading as the perforating or blanking punch is just past the point of shear. This has caused punch and die failure, press failure, etc., to such an extent that hydraulic presses are not used for perforating or blanking. For these reasons, metal working or blanking is generally accomplished on mechanical presses employing the conventional crank pin and mechanical clutches with solid transmission characteristics.

It has been determined that some amount of resilience and yield is desirable in perforating or blanking. This of necessity must be held within the limit of the small travel of a punch from its point of entry into the blank to the point of shear of the blank. The point of shear of a punch material is normally, for hard materials, from 2% to 5% of the metal thickness, and, for soft materials, from 5% to 30% of the metal thickness. Now the gradual build-up of force during a relatively long travel, and the sudden release of the load as the slug breaks free, are not present when soft, thin materials are being perforated, or blanked. In perforating or blanking such materials, compression of material under the punch is gradual and builds up to a peak, and the shear load slopes off more gradually. This type of perforating or blanking is not critical as regards the shock load of the perforating punch. However, in perforating heavy duty material, either soft or hard, where the thickness of the blank is ¼" or more, or in multiple punching, or in blanking large sheets of thin material, this peak is reached very rapidly and diminishes very rapidly. As in the case of the hard materials and thicker gauges, a sudden build-up of pressure occurs before shearing takes place, which is suddenly released and which will cause great damage to the conventional hydraulic press. The volume of liquid in most hydraulic presses is such that the limited compressibility of say, mineral oil, of 3% at 10,000 p. s. i. causes a movement of the ram at the instant of shear, due to the release of the stored-up energy of the compressed liquid, of possibly up to ⅛". This sudden movement of the heavy mass of the press ram and punch causes the punch to project into the die and may damage it. In any event it imparts shock load to the entire press-working mechanism including the frame, the piping and the cylinder walls. This is true also where a plurality of perforating punches, or one or more large blanking punches, at one instant shear a large area of the material out of thin hard metal.

I have found that these difficulties can be overcome, and at the same time longer punch life and longer die life can be achieved by transmitting motion to the ram of the punch press through liquid entrapped between a piston and cylinder, and by precisely controlling the volume of liquid in the closed chamber between the piston and cylinder, to such a point that the movement of the ram due to fluid resiliency is extremely limited, and yet this same fluid resiliency provides a gradual load application, so that the impact of a high speed punch engaging a work piece and subsequently perforating it is reduced. This impact load on punches is almost as serious as hydraulic failures on hydraulic presses and it is to the elimination of both problems that the invention of my previous application Serial No. 73,271, now patent No. 2,621,480, and my present invention are directed.

As has heretofore been indicated, it is desirable to have the advantages of both high speed operation and gradual load application in a single mechanism, and prior to my application Serial No. 73,271, now Patent No. 2,621,480, above mentioned this was impossible. What is accomplished with the device of my copending application Serial No. 73,271, now Patent No. 2,621,480, and with this present invention is the provision of the controlled cushioned action of a hydraulic transmission coupled with the high speed essential for production punching operations.

The primary object of this invention is to provide means for effecting high-velocity, intermittent, fluid-cushioned power transmission.

Another object of this invention is to provide a simple economical apparatus for transmitting power through a liquid.

Another object of this invention is to provide a power-transmitting mechanism wherein all mechanical noise is eliminated.

Another object of this invention is to provide a power-transmitting mechanism of the type described which may be assembled or disassembled as a unit from the machine.

A further object of this invention is to provide a power-transmitting mechanism for a punch press requiring less space than a conventional mechanical power-transmitting mechanism whereby the machine can be made smaller and more compact.

Another object of this invention is to provide a liquid-cushioned power transmission mechanism in which the volume of liquid employed is low whereby resiliency is provided within practical limits thereby insuring increased punch and die life.

Still another object of this invention is to provide a mechanism of the character described for a punch press in which liquid is entrapped between a piston and a cylinder to transmit power to the ram, and is allowed to circulate freely between the cylinder and a chamber formed in the piston when it is desired that the tool idle.

Another related object of the invention is to eliminate foaming of the liquid in use.

A further object of the invention is to provide a mechanism of the character described through which the full power stroke of the reciprocal piston may be attained.

Another object of the invention is to provide a clutch or power-transmitting mechanism of the character described which may be disposed adjacent the work area of the machine to simplify the machine construction.

Another object of the invention is to provide a clutch or power-transmitting mechanism of the character described requiring less space.

A further object of the invention is to provide a clutch of the character described in which the relatively movable parts are engaged at a time when the velocity of the moving, driving part is at or near the zero velocity of the static driven part.

Still another object of the invention is to provide an entrapped liquid clutch in which the valve, which is enclosed to entrap the liquid, is sealed all the tighter as the load on the clutch is increased.

Still a further object of the invention is to provide an entrapped liquid clutch in which the means for sealing the clutch closed is light and requires very slight inertia forces to actuate it, whereby the clutch-actuating linkage may be lighter.

Other objects of the invention will be apparent hereinafter from the description and from the appended claims.

Figure 6:
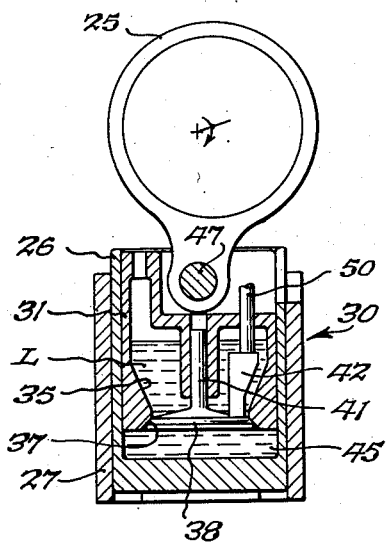
Figure 8:
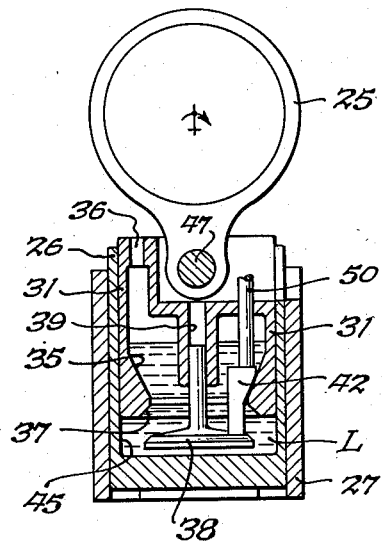
Figure 7:
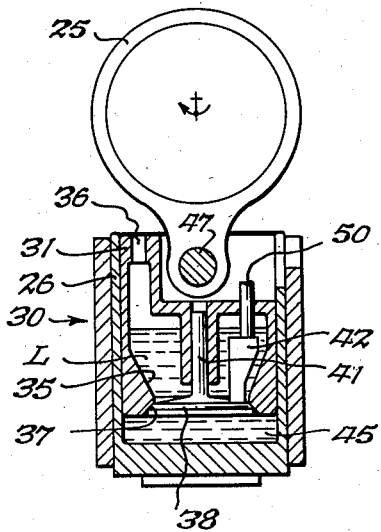
Figure 9:
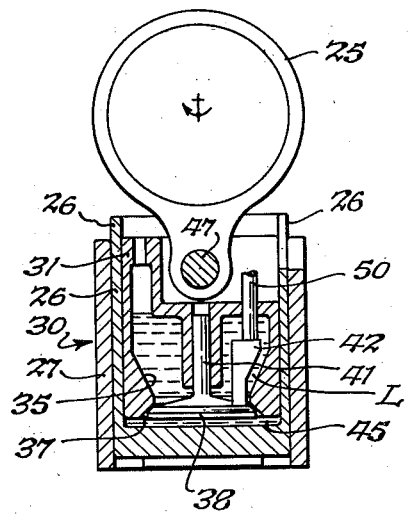
Figures 10, 11:
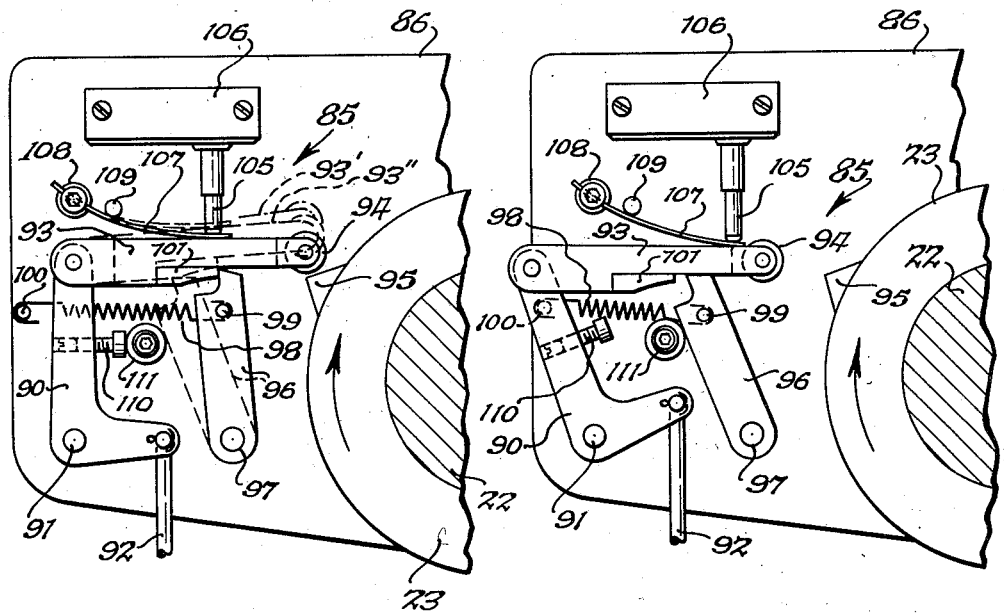
Figure 12:
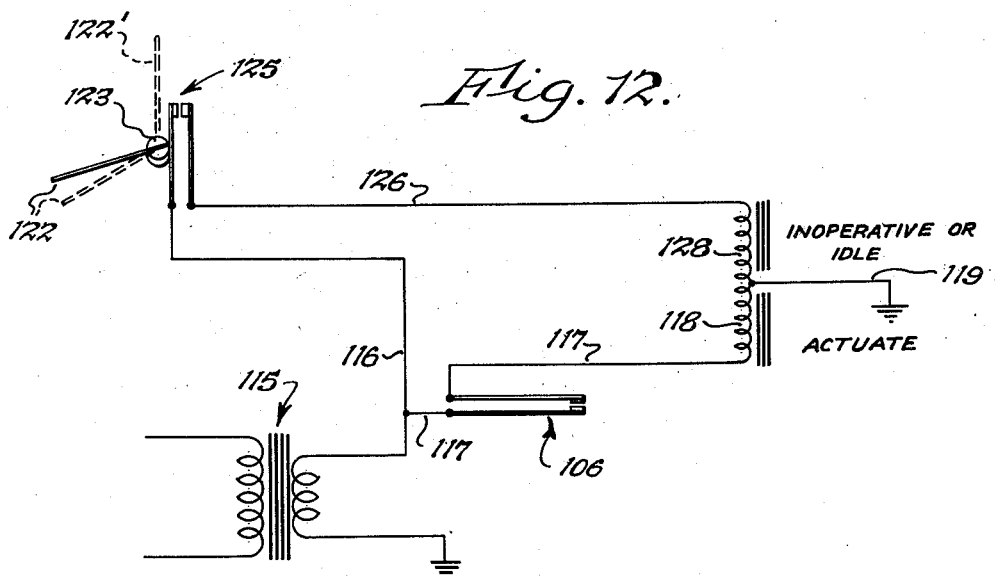

Figs. 6 to 9 inclusive are diagrammatic views illustrating the operation of the clutch mechanism shown, Fig. 6 illustrating the piston part way down on its down stroke and the poppet valve sealed to entrap liquid between piston and cylinder so that press-working stroke is being effected, Fig. 7 illustrating the ram at the bottom of the working stroke, Fig. 8 illustrating the piston at the top of its idle stroke and the poppet valve open so that the reservoir which is in the piston and the chamber between piston and cylinder are in communication, and liquid can circulate freely between them, and Fig. 9 illustrating the piston at the bottom of its idle stroke showing that the liquid can still circulate freely through the valve;

Fig. 10 is a fragmentary view showing in full lines the novel single stroke tripping mechanism for my clutch after it has been advanced manually to cocked position and as it is about to be actuated to trip the electrical switch, and illustrating in dotted lines its inoperative position;

Fig. 11 is a view of the novel single trip apparatus showing its retracted or inoperative position; and Fig. 12 is an electrical wiring diagram of the various elements of this machine.

Figure 1:
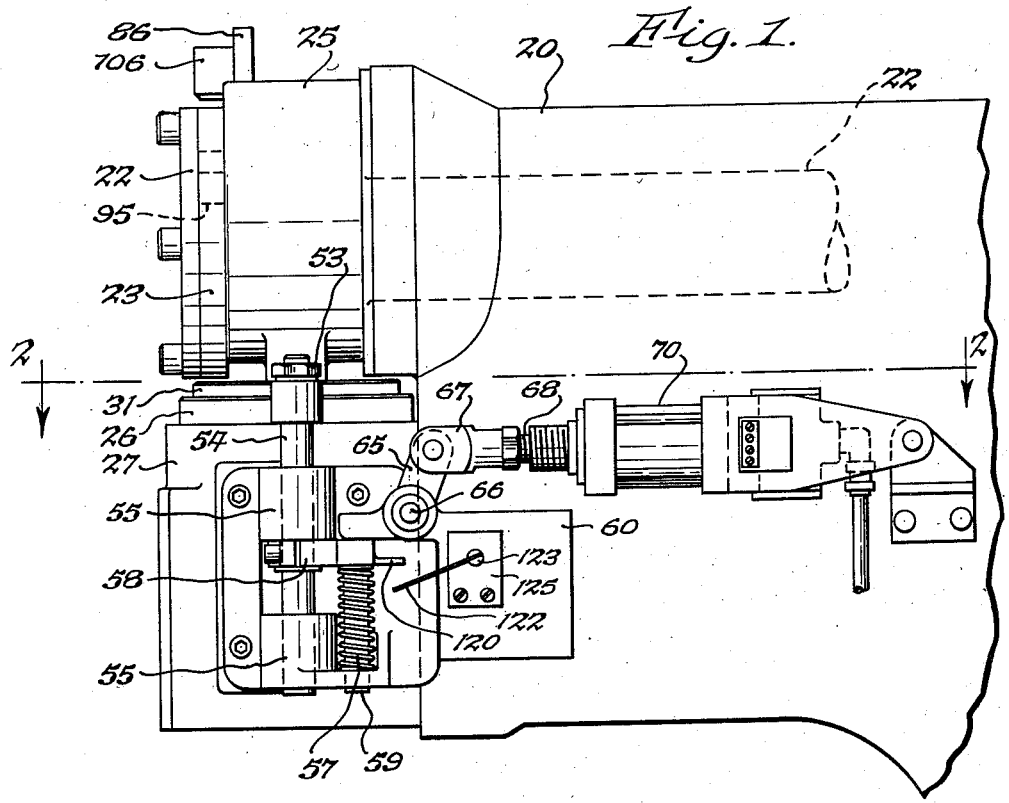
Fig. 1 is a fragmentary side elevation of a punch press embodying the novel clutch or power transmission apparatus of my invention.

In Fig. 1, 20 denotes the press frame of a conventional gap-type press of a standard type, and on which the power transmission device of the present invention is used. In particular the press is similar to that illustrated in Fig. 13 of my prior Patent No. 2,364,011. In this type press, the drive to the ram is from a rotary shaft 22. This shaft has an eccentric secured to it that drives a pitman or link 25. The shaft 22 also has a cam 23 secured to it whose function will appear hereinafter. The pitman is connected to the ram 26 which actuates the perforating or blanking tool. This ram is reciprocable in a ram housing 27.

Figure 3:
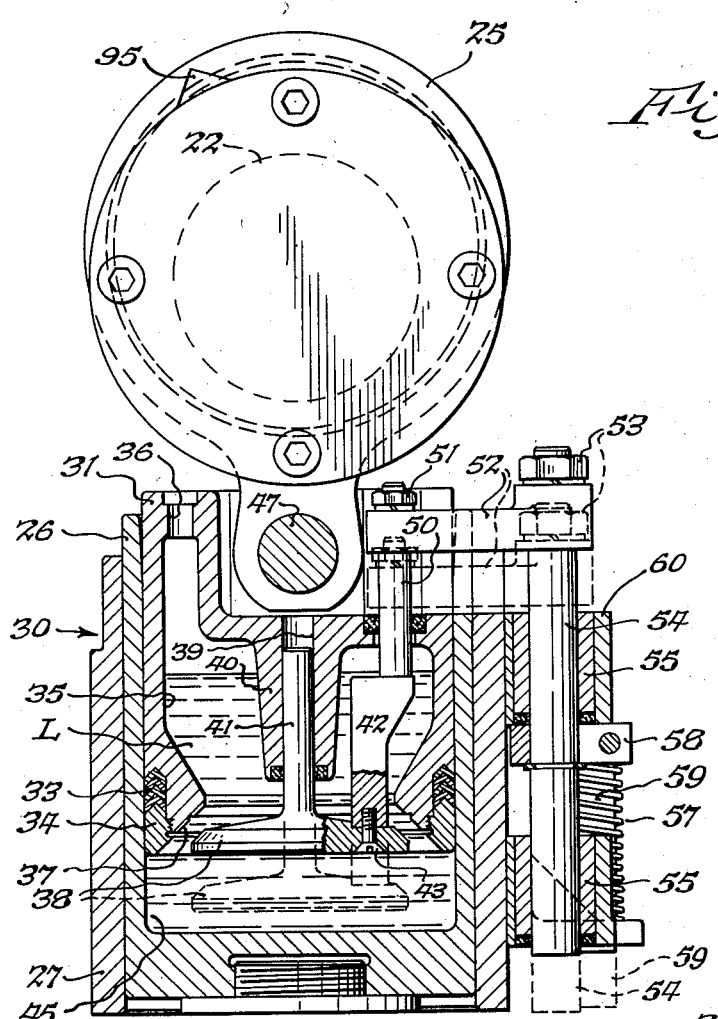
Fig. 3 is a part front elevation, part section, showing the clutch of the present invention and illustrating among other things the novel poppet valve, and showing in full and in dotted lines, respectively, its positions for shutting off and for permitting flow of the power-transmitting liquid.

In the press of the present invention the connection of the ram 26 with the pitman or link 25 is through a novel clutch designated generally at 30 (Fig. 3). Ram 26 is hollow and closed at its lower end. It has a piston 31 reciprocable therein which is also hollow. The outside surface of piston 31 slides in and is guided by the inside surface of ram 26. Piston 31 is sealed with reference to its sliding fit in ram 26 so that there can be no passage of liquid between the outside surface of the piston and the inside surface of the ram. For this purpose a conventional chevron seal 33 is provided. This seal is held in position by a ring 34 that threads onto the skirt portion of piston 31.

Piston member 31 has formed at its lower end a conical valve seat 37 for the reception of a conventional poppet valve 38. The stem 41 of this poppet valve 38 is slidable within the bore 39 of the centrally disposed guide portion 40 of piston member 31. The poppet valve 38 is adapted to be operated by a push-pull member 42 that is affixed to the valve member 38 by a screw 43 so that the two move together as a unit. Push-pull member 42 may be operated by a mechanism such as will be described hereinafter in detail.

Piston 31 is, as previously stated, hollow and has a chamber or reservoir 35 formed therein which is vented to the atmosphere through a vent hole 36. The ram 26, as previously stated, is hollow and has formed therein a chamber 45. When the valve member 38 is open, that is, is off of its seat 37, chamber 45 of ram 26 is in communication with chamber 35 of piston 31 and the liquid L can flow freely between them. When the valve member 38 is seated on the conical valve seat 37, the liquid is trapped between the ram 26 and the reciprocating piston member 31 in the chamber 45. Since this entrapped fluid is essentially incompressible when trapped therein, in effect it transmits a power operating stroke from the reciprocating piston member 31 to the reciprocable ram member 26.

Piston 31 is connected to pitman 25 by pin 47. Thus power is transmitted to ram 26 through piston 31 and liquid entrapped in chamber 45 when valve 38 is closed. However, when the valve 38 is open, no power is transmitted to ram 26, but piston 31 merely reciprocates idly in ram 26 as shaft 22 rotates.

In my copending application Serial No. 73,271, now Patent No. 2,621,480 I trap fluid between a reciprocating piston member and a reciprocable sleeve member so that the entrapped fluid acts as a solid member, or esentially so, just as it does in the device of the present invention, to transmit force from the reciprocating piston to a reciprocable ram on demand. In the device of my prior application, however, the sleeve member is ported into the ram housing. To prevent leakage a rubber O-ring type seal is used on each side of the ported area so that in effect there are two points of sealing. If failure of one or the other occurs, leakage outside the press occurs causing ultimate failure of the power transmission apparatus.

One difference between the apparatus of my prior application Serial No. 73,271, now Patent No. 2,621,480 and the device of the present application is that these two points of sealing to the exterior are eliminated. Instead, only one source of possible leakage to the exterior is present; and this is sealed by a seal 33 (Fig. 3) which is within the interior of the apparatus. Furthermore, the fluid-entrapment means consists of the friction-free, low inertia mechanical poppet valve 38 already described rather than of a constant-contact frictional rubber type seal, such as used in my prior construction, which must engage and slide past a shoulder member to seal the ports.

The basic advantages of my new construction over the old are: First, there is only one possible point of leakage. Secondly, the sealing member does not have to pass a shoulder to effect sealing. Third, leakage through the seal is not important since some liquid returns by gravity as the seal works under no load and the ratio of the volume of liquid to the possible leakage through poppet valve 38 is such that at worst the apparatus will give slightly but in no instance will it fail while in operation because of such leakage. Fourth, in the clutch of the present invention a poppet valve is employed to effect clutching. It is a well known fact that poppet valves seal tighter under increased pressure while friction seals tend to leak more under greater pressures. Fifth, the entire clutch mass does not have to be shifted to seal with the seals in contact. This reduces the number of seals required, as stated above, and a multiple chevron type seal 33 can be used, thereby reducing possibility of leakage still more. Leakage which at times may cause double-tripping or repeat tripping in the device of my prior application Serial No. 73,271, now Patent No. 2,621,480 and which is always a source of possible failure in a hydraulic clutch, is thus mitigated and from a practical viewpoint obviated in the device of the present invention. Another advantage of the device of the present invention over the previous device is in the liquid passage. In the old device the parts had to be of sufficient size to carry the volume of liquid in and out of the respective chambers without foaming or vapor formation. This in turn limited the proportion of the reciprocal stroke of the piston which could be used for a power stroke. In the device of the present invention the liquid can course freely between chambers 35 and 45 without substantial restriction and yet a full stroke of the reciprocal piston can be realized.

Reference now will be had to Figs. 6 to 9 inclusive for a description of the method of operation of the device of the present invention.

Figure 5:
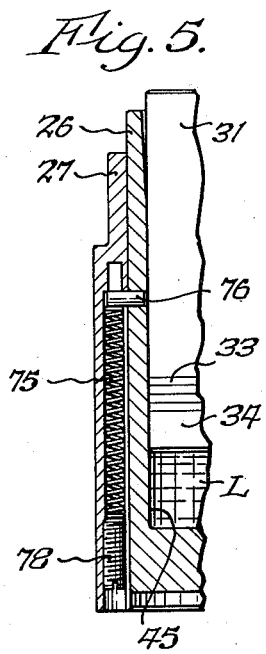
Fig. 5 is a fragmentary section taken as noted on line 5—5 of Fig. 2 and illustrating in particular one of the plurality of spring elevating means for holding the press ram in an inoperative position until the apparatus is actuated.

Fig. 6 shows the ram near the top of its stroke. When the valve member 38 is seated on seat 37, as shown in Figs. 6 and 7, liquid is entrapped between ram 26 and piston 31 in the ram chamber 45. As the shaft 22 revolves, then, ram 26 is driven downwardly from the position shown in Fig. 6 to that of Fig. 7, power being transmitted from shaft 22 through pitman 25, piston 31, and the liquid trapped in chamber 45 to the ram. The ram 26 is returned to and held in its upper or elevated position, shown in Fig. 6, by springs 75 (Fig. 5). A plurality of these springs are mounted in the ram housing 27 about ram 26. These springs engage a plurality of pins 76 that are secured in the ram. The tension of the several springs 75 is adjusted by associated screws 78 to effect the necessary upward resilient biasing force to urge the ram toward and to hold it in its elevated position.

Figs. 8 and 9 show what happens when valve member 38 is held off its seat. When valve member 38 is off its seat 37, the liquid L can move freely back and forth between the reservoir chamber 35 of piston 31 and the chamber 45 of ram 26, liquid passing back and forth therebetween with each reciprocating stroke of the reciprocating piston member 31. Thus the liquid sloshes or reciprocates back and forth between the two chambers as it is displaced by reciprocating piston 31 without transmitting any force to the ram member 26. When valve member 38 is off its seat it is held stationary relative to the reciprocating piston 31 by push rod 42. Fig. 8 shows the position of the parts when the piston is at the limit of its upstroke. Chambers 35 and 45 are in free communication. Fig. 9 shows the piston member at the bottom of its stroke. It will be noted that although the piston has descended, the valve 38 still is not seating on seat 37 so that the fluid chambers are still in communication. Thus piston 37 can reciprocate idly in ram 26 without transmitting motion to ram 26.

Having thus discussed the basic principle of operation of the clutch member, I will now consider the mechanical means by which the desired stroke sequence of this apparatus is achieved.

Figure 2:
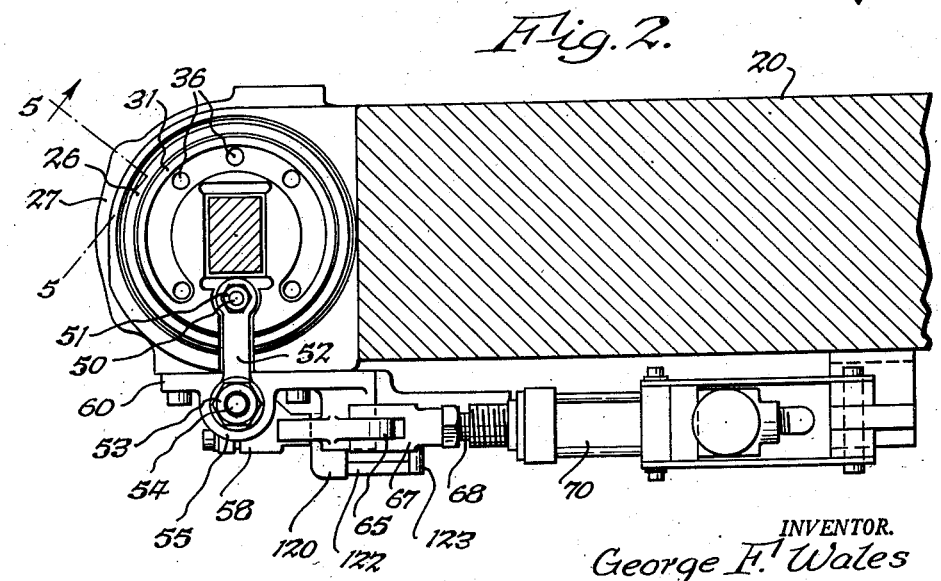
Fig. 2 is a view taken along line 2—2 of Fig. 1, looking in the direction of the arrows and illustrating the relation between the press and power transmission device linkage.

It will be observed in Figs. 1, 2 and 3 that push-pull shaft 42 has a rod portion 50 integral therewith which is attached by nut 51 to a bar 52. This bar is secured by nut 53 to a slidable member 54 that is journalled in bearings 55 mounted on the exterior of the ram housing 27. This member and valve 38 are biased toward the closed position of the valve by spring 57. This spring is operably associated with slidable member 54 through a clamp 58 which is adjustably secured to shaft 54. Spring 57 surrounds a guide rod 59 which is attached to clamp member 58 that is slidable in a bracket 60 which is integral with bearings 55. The valve is biased by this spring to its closed position. If it were retained in this particular position the clutch would be continuously operative, as the liquid would be entrapped as in Figs. 6 and 7, so that the machine would perform a nibbling operation.

Figure 4:
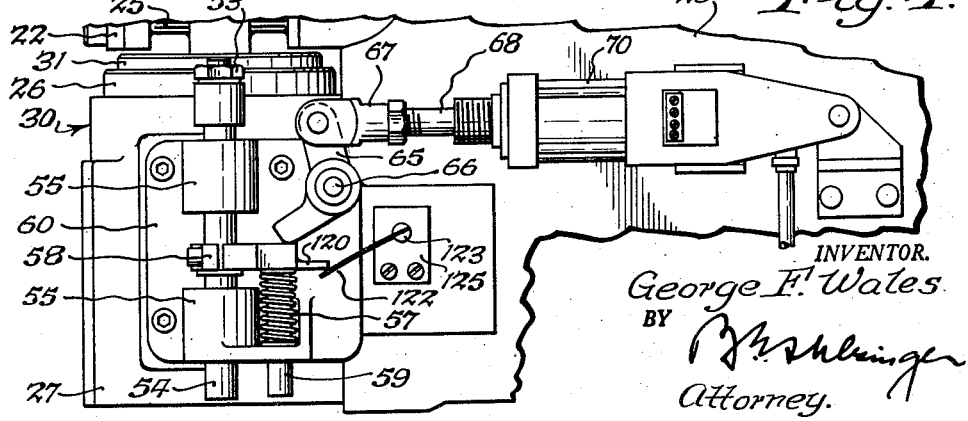
Fig. 4 is a fragmentary elevation, similar to Fig. 1, but showing another position of the valve control linkage, namely, the position when the clutch mechanism is actuated.

For shifting the valve 38 there is a bell-crank member 65 (Figs. 1, 2 and 4), operably associated with the clamp member 58. This bell-crank member is pivoted at 66 on bracket 60. This member has one arm engaging clamp member 58 and its other arm is connected by a clevis 67 with the rod 68 of a piston (not shown) that reciprocates in an air cylinder 70. Cylinder 70 is secured in any convenient manner to one side of the press. In Fig. 4 the bell-crank member 65 is shown in the position to which it is moved by the air-operated piston to open valve 38. Fig. 2 shows the position of the bell-crank when the valve is closed.

For effecting single-stroke, as contrasted with continuous stroke operations of the press, a single-stroke mechanism, such as shown in Figs. 10 and 11 and such as is illustrated in the wiring diagram of Fig. 12, is employed, to effect closing of the valve 38 and the entrapment of the fluid. This single-stroke mechanism is designated generally at 85. It is mounted on a plate 86 attached to the front of the press, and is actuated by the cam 23 on the drive shaft 22 of the press. The purpose of this single-stroke mechanism is to cut off the operation of the press after it is initiated by the operator and after it has performed one complete working and return stroke. This assures a single stroke of the press when it is tripped.

This combination electric-mechanical device comprises a bell-crank 90 that is pivotally mounted by means of pin 91 on the front of the press. One arm of bell-crank 90 is pivotally connected to a rod 92 which may be actuated either manually or by a foot pedal (not shown). The other arm of bell-crank 90 is pivotally connected to one end of a trip lever 93. This lever carries at its other, free end a roller 94, that is adapted, when the lever 93 is in the position shown in Fig. 10 to be engaged by protuberance 95 of cam 23.

A lever 96, that is pivoted at 97 on the press, is adapted to engage lever 93. This lever 96 is constantly urged counterclockwise about its pivot 97 by a coil spring 98 which is connected at one end by pin 99 to the lever 96 and is connected at its other end by pin 100 to the press.

Lever 93 engages at its upper side plunger 105 of a conventional electrical limit switch 106. Lever 93 is constantly urged downwardly by a leaf spring 107 that is secured to the press by a pin 108. A pin 109, that is secured in the press, acts as a fulcrum for spring 107.

Fig. 11 shows the positions of the parts of the single-stroke mechanism when the press is idling. When push-pull rod 92 is actuated either manually or by the foot pedal, bellcrank 90 is moved clockwise about its pivot to the position shown in Fig. 10. This moves push-pull lever 93 to the right from the position shown in full lines in Fig. 11 and in dotted lines in Fig. 10 to the full line position of Fig. 10. Thus, roller 94 is disposed in position to be engaged by protuberance 95 of cam 23 as the cam revolves. Clockwise motion of bellcrank 90 is stopped when adjustable stop screw 110, that is carried by the bellcrank, engages the stop pin 111 which is secured in the frame of the press.

When cam protuberance 95 strikes roller 94 it moves the lever 93 upwardly to the dotted line position denoted at 93' in Fig. 10, tripping switch 106. This closes a circuit from transformer 115 (Fig. 12) through lines 116, 117, now-closed switch 106, line 117, a solenoid 118, and line 119 to the ground. Solenoid 118 operates in conjunction with the valve (not shown) that controls the piston of air cylinder 70, and shifts that valve to effect movement of the piston and its piston rod 68 to the right from the position shown in Fig. 4 to that shown in Fig. 1. This swings bellcrank 65 clockwise (Fig. 1) about its pivot 66 releasing clamp member 58, and allowing spring 57 to move the member 58, rod 54 (Fig. 3), bar 52, rod 50 and bar 42 upwardly, thus moving poppet valve 38 to closing position.

The protuberance 95 is so located on cam 23 that the movement of the poppet valve to closing position takes place on the upstroke of piston 31 which, of course, reciprocates continuously when the machine is in operation due to its connection with continuously rotating shaft 22. On the next downstroke of the piston 31, then, seat 37 on the piston engages poppet valve 38, sealing ram-chamber 45 from piston-chamber 35. Clamp member 58 is limited in its movement under impulse of spring 57 by upper guide part 55. This also limits upward movement of poppet valve 38. This insures that when piston 31 comes into sealing engagement with the poppet valve a uniform quantity of liquid will be entrapped in chamber 45.

Meanwhile lever 93 which has moved initially upwardly to position 93' (Fig. 10) due to inertia, closing switch 106, drops back to position 93" after its initial surge, allowing switch 106 to open again.

As the piston 31 moves downward, after poppet valve 38 has been closed, it drives, through the entrapped liquid, the ram 26, as already described. Clamp member 58 has a lug or trip member 120 (Figs. 4 and 1) secured thereto. When the ram reaches the lower limit of its stroke, member 120 engages a spring lever finger 122 that is secured to a rotatable knob 123 (Fig. 12) that operates a normally open switch 125, closing this switch. This closes a circuit from transformer 115 through line 116, switch 125, line 126, solenoid 128 and line 119 to the ground. Solenoid 128 operates in conjunction with the valve already mentioned that controls the piston in air cylinder 70 (Fig. 4). When solenoid 128 is energized the valve is shifted causing the piston rod 68 to be shifted back from the position shown in Fig. 1 to the position shown in Fig. 4. This opens poppet valve 38, opening occurring as the piston 31 begins its upstroke. The ram is returned to its upper position by springs 75 (Fig. 5), but, unless the poppet valve is moved to closing position again by downward movement of rod 92 (Figs. 10 and 11), on the next downstroke of piston 31, ram 26 remains in its upper position and the piston 31 idles, the liquid passing freely between chambers 35 and 45 as is shown in the diagrammatic views of Figs. 8 and 9.

Now when lever arm 93 was moved initially by protuberance 95 of cam 23 upwardly to position 93', lever 96 was moved by spring 98 against stop 111. As soon as the protuberance 95 of cam 23 rotated clear of roller 94, the lever arm 93 dropped down by gravity but it could not drop clear back to the full line position of Fig. 10 because dog 96 stops it in position 93" by engagement with the lug 101 of the lever arm. In this position 93", roller 94 is held high enough so that it cannot be engaged by protuberance 95. Hence switch 106 cannot be closed again to cause shift of the piston in cylinder 70 and movement of poppet valve 38 to closed position. Thus the cam 23 can rotate without effecting movement of the ram, until after bellcrank 90 has first been restored to the position shown in Fig. 11 and then actuated again to the position of Fig. 10 by movement of rod 92. Thus, single-stroke action of ram 26 is attained.

Rod 92 and bellcrank 90 are restored to the positions of Fig. 11 when released manually or by removing the foot from the foot treadle. A spring, as in conventional practice, may effect this restoration. Restoration of rod 92 and bellcrank 90 to the positions shown in Fig. 11 causes return of push-pull rod 93 to the position shown in Fig. 11, and causes dog 96 to slide under lug 101 so that all the parts of the single stroke mechanism are restored to the positions shown in Fig. 10.

Where it is desired to perform a nibbling operation, the spring switch arm 122 is swung to the position indicated in dotted lines at 122' in Fig. 12, upwardly out of the path of lug or trip 120 so that it will not be operated by that lug. The machine operator then depresses rod 92. This closes switch 106 and energizes solenoid 118 to move poppet valve 38 to closing position. Since, with arm 122 in nibbling position 122', switch 125 cannot be closed, switch 125 is in effect cut out. Poppet valve 38 is therefore held sealed and the piston 31 will reciprocate ram 26 in a continuous operation. This will continue until switch lever 122 is restored to its normal position in position to be engaged by trip lug 120.

While the invention has been described in connection with a specific embodiment thereof, it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A clutch comprising a driving element and a driven element, one of said elements being a reciprocal piston and the other of said elements being a reciprocable cylinder in which said piston reciprocates and in which it is guided in its reciprocation, said piston being hollow and having a chamber formed therein for liquid, and said cylinder being hollow to provide a second chamber confronting the chamber of said piston, and a valve carried by one of said elements and controlling communication between said chambers, said valve being movable in one direction independently of the stroke of said one element to close off said communication to entrap liquid between the piston and cylinder to cause one to drive the other, and said valve being movable in the opposite direction independently of the stroke of said one element to establish said communication so that said cylinder and said piston may move relative to one another without one driving the other, and means separate from said piston and said cylinder for moving said valve in both said one direction and said opposite direction in said one element.

2. A clutch comprising a reciprocable hollow cylinder, a piston reciprocable in said cylinder and guided by said cylinder in its reciprocation, said piston being hollow and having a chamber formed therein confronting and communicating with the interior of said cylinder, said chamber and the interior of said cylinder being adapted to contain a liquid, and a valve mounted in said piston to reciprocate relative thereto independently of the reciprocation of said piston but in the direction of reciprocation of the piston, means for moving said valve downwardly to open position to allow free flow of the liquid between said piston and said cylinder so that said piston may reciprocate relative to said cylinder without driving said cylinder, said valve at the lower end of its stroke being displaced from said piston at the lower end of the piston's stroke whereby said valve will remain open despite the reciprocation of said piston, means for moving said valve upwardly to a closing position, means for limiting the upward movement of said valve at the upper end of its closing stroke so that said valve is offset downwardly from the piston at the upper end of the piston's stroke whereby said valve opens at the upper end of the piston stroke even when the valve is in closing position, whereby said valve will not close until the piston has moved some distance on its next downward stroke.

3. A clutch comprising a reciprocable cylinder and a piston reciprocable therein, said piston being hollow and having a chamber therein confronting and communicating with the interior of said cylinder, said piston having a valve seat at its inner end, a valve adapted to seat on said valve seat thereby to seal off said chamber from the interior of said cylinder and to entrap liquid between said piston and cylinder whereby said piston will drive said cylinder through the entrapped liquid, said valve being mounted on said piston for movement coaxially thereof toward and away from its seat, means for moving said valve from its seat independent of said piston to open position, and means for constantly urging said valve resiliently toward its seat, and means for limiting the movement of the valve in both directions whereby the outer limit of movement of the valve is spaced inward of the outer limit of movement of the piston, and whereby the inner limit of movement of the valve is spaced inward of the inner limit of movement of the piston so that when said valve is in open position said piston may reciprocate in said cylinder without transmitting motion to said cylinder.

4. In a punch press, a rotary shaft, a reciprocable tool-carrying ram constituting a first reciprocating part, said ram being hollow and having a chamber formed therein, a piston reciprocable in said ram chamber and constituting a second reciprocating part, means connecting said piston to said shaft to reciprocate said piston on rotation of said shaft, said piston being hollow and having a chamber formed therein adapted to contain a liquid and to communicate with the first-named chamber, and a valve reciprocable in one of said reciprocable parts to move it from open to closed position, and vice versa, and operative when in closed position to seal off communication between said chambers to entrap liquid between said piston and said ram to cause said piston to drive said ram through the entrapped liquid, said valve when open permitting the liquid to flow freely between said chambers whereby said piston may reciprocate in said cylinder without transmitting motion to said cylinder, and means controlled by said shaft for controlling the position of said valve.

5. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston, having a chamber formed therein adapted to contain a liquid and to communicate with the first-named chamber, and a valve mounted reciprocably in said piston for sealing off communication between said chambers to entrap liquid between said piston and said ram to cause said piston to drive said ram through the entrapped liquid, said valve being reciprocable in said piston in the direction of reciprocation of said piston, means for resiliently biasing said valve toward closed position, said valve when open permitting free flow of liquid between said chambers so that said piston may reciprocate in said ram without transmitting motion to said ram, and means actuated by said shaft for opening said valve after the ram has completed a working stroke.

6. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston being hollow and having a chamber formed therein adapted to contain a liquid and to communicate with the first-named chamber, and a valve mounted reciprocably in said piston for sealing off communication between said chambers to entrap liquid between said piston and said ram to cause said piston to drive said ram through the entrapped liquid, said valve being reciprocable in said piston in the direction of reciprocation of said piston, means for resiliently biasing said valve toward closed position, and means operated by the ram at the end of its working stroke to move said valve to open position.

7. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston being hollow and having a chamber formed therein adapted to contain a liquid and to communicate with the first-named chamber, and a valve mounted reciprocably in said piston for sealing off communication between said chambers to entrap liquid between said piston and said ram to cause said piston to drive said ram through the entrapped liquid, said valve being reciprocable in said piston in the direction of reciprocation of said piston, means for resiliently biasing said valve toward closed position, and means operated by the ram at the end of its working stroke to move said valve to open position, said last-named means being movable to inoperative position to permit continued reciprocation of the ram, and means for returning the ram to its starting position on completion of each working stroke.

8. In a punch press, a rotary shaft, a reciprocable tool-carrying ram, said ram being hollow and having a chamber formed therein, a piston reciprocable in said ram chamber, means connecting said piston to said shaft to reciprocate said piston on rotation of said shaft, said piston being hollow and having a chamber formed therein adapted to contain a liquid and to communicate with the first-named chamber, and said piston having a valve seat formed at its inner end, a valve reciprocable in said piston in the direction of reciprocation of the piston but being movable from an open, inner position inward of the inner limit of movement of the piston to an outer, closing position inward of the inner limit of movement of the piston, means for resiliently biasing said valve to its outer closing position whereby it is engaged by said piston on the inward movement of said piston to seal off communication between said chambers to entrap liquid between said piston and said ram to cause said piston to drive said ram in a working stroke through the entrapped liquid, a movable detent for holding said valve in open position against the resistance of said resilient means, means for moving said detent to inoperative position, resilient means for effecting the return stroke of said ram, and means for moving said valve to its inner open position to establish communication between said chambers to allow said piston to reciprocate without effecting movement of said ram, and means operated by the ram at the end of its working stroke for actuating the last-named means.

9. In a punch press, a rotary shaft, a reciprocable tool-carrying ram, a piston reciprocable in said ram, means connecting said piston to said shaft to reciprocate said piston on rotation of said shaft, said ram being closed at one end and being open at its other end and having a chamber formed therein, said piston having a chamber formed therein confronting the chamber in said ram and being open at the end thereof which is proximal to the closed end of said ram thereby to permit communication between said chambers, said chambers containing a liquid, a valve mounted in one of said reciprocable members to reciprocate relative thereto, means for holding said valve in open position, means for moving said valve from an open position toward a closing position, means for limiting the movement of said valve toward closing position so that said valve is displaced from said piston at the end of the piston stroke on which the piston approaches the closed end of said ram, and means for limiting the amount of the closing movement of said valve whereby said valve remains open at the receding end of the piston stroke and is not closed until the piston has moved some distance on its next approaching stroke, said valve when closed shutting off communication between said chambers and entrapping liquid between said piston and said ram so that said piston may drive said ram in one direction, said valve when open permitting free flow of liquid between said chambers so that said piston may reciprocate relative to said ram without driving said ram, means for preventing actuation of said valve moving means, and means operable by said rotary shaft in its rotation for rendering the last-named means inoperative.

References Cited in the file of this patent

UNITED STATES PATENTS

| | | |
|---|---|---|
| 414,910 | Krause | Nov. 12, 1889 |
| 662,515 | Yale | Nov. 27, 1900 |
| 2,227,279 | Smith | Dec. 31, 1940 |
| 2,296,283 | Jorgensen | Sept. 22, 1942 |
| 2,364,011 | Wales | Nov. 28, 1944 |
| 2,528,198 | Wales | Oct. 31, 1950 |
| 2,580,382 | Banker | Jan. 1, 1952 |
| 2,682,865 | Voorhies | July 6, 1954 |
| 2,689,554 | Moser | Sept. 21, 1954 |
| 2,691,367 | Thoren | Oct. 12, 1954 |

FOREIGN PATENTS

| | | |
|---|---|---|
| 173,712 | Germany | July 26, 1906 |